(12) United States Patent  
Miyamoto et al.

(10) Patent No.: US 7,069,428 B2
(45) Date of Patent: Jun. 27, 2006

(54) SYSTEM FOR MANAGING BOOT-UP OF TARGET COMPUTERS

(75) Inventors: Carleton Miyamoto, San Jose, CA (US); Jagadish Bandhole, Cupertino, CA (US); Sekaran Nanja, San Jose, CA (US)

(73) Assignee: Veritas Operating Corporation, Mountain View, CA (US)

( * ) Notice: Subject to any disclaimer, the term of this patent is extended or adjusted under 35 U.S.C. 154(b) by 391 days.

(21) Appl. No.: 10/241,808

(22) Filed: Sep. 10, 2002

(65) Prior Publication Data

US 2004/0049671 A1    Mar. 11, 2004

(51) Int. Cl.
*G06F 15/177* (2006.01)
(52) U.S. Cl. .............. 713/1; 713/2; 717/174; 717/175
(58) Field of Classification Search .......... 713/1, 713/2; 717/174, 175
See application file for complete search history.

(56) References Cited

U.S. PATENT DOCUMENTS

| 5,452,454 | A | * | 9/1995 | Basu .................... 713/2 |
| 5,577,210 | A | * | 11/1996 | Abdous et al. ........... 709/219 |
| 5,842,011 | A | * | 11/1998 | Basu .................... 713/2 |
| 5,948,101 | A | * | 9/1999 | David et al. ............ 713/2 |
| 5,974,547 | A |  | 10/1999 | Klimenko ............... 713/2 |
| 6,092,189 | A |  | 7/2000 | Fisher et al. ............ 713/1 |
| 6,101,601 | A | * | 8/2000 | Matthews et al. ........ 713/2 |
| 6,189,100 | B1 | * | 2/2001 | Barr et al. .............. 713/182 |
| 6,202,091 | B1 | * | 3/2001 | Godse ................... 709/222 |
| 6,262,726 | B1 |  | 7/2001 | Stedman et al. .......... 345/333 |
| 6,298,443 | B1 |  | 10/2001 | Colligan et al. .......... 713/200 |
| 6,421,777 | B1 | * | 7/2002 | Pierre-Louis et al. ...... 713/2 |
| 6,463,530 | B1 | * | 10/2002 | Sposato ................. 713/2 |
| 6,466,972 | B1 | * | 10/2002 | Paul et al. .............. 709/222 |

(Continued)

OTHER PUBLICATIONS

Huang, Peter, California Polytechnic State University *Design and Implementation of the CiNIC Software Architecture on a Windows Host*, Feb. 2001, pp. i-87, http://www.ee.calpoly.edu/3comproject/masters-thesis/Huang-Peter.pdf.

(Continued)

*Primary Examiner*—A. Elamin
(74) *Attorney, Agent, or Firm*—Campbell Stephenson Ascolese LLP

(57) ABSTRACT

A system for managing boot-up of target machines. In a preferred embodiment, a server computer acts as a managing computer. A target machine notifies the server that the target machine has been powered-up. The server allocates an IP address and sends a response to the target machine. The target machine download boot-up software from the server computer. The target machine then downloads discovery software from the server computer for purposes of determining information about the configuration and resources of the target machine. Standard protocols and mechanisms such as DHCP, BOOTP, TFTP and others can be used. The system works with different types of manufacturers' processors and platforms.

14 Claims, 1 Drawing Sheet

U.S. PATENT DOCUMENTS

| | | | |
|---|---|---|---|
| 6,477,624 B1 | 11/2002 | Kedem et al. | 711/147 |
| 6,498,791 B1 | 12/2002 | Pickett et al. | 370/353 |
| 6,512,526 B1 | 1/2003 | McGlothlin et al. | 345/762 |
| 6,550,006 B1* | 4/2003 | Khanna | 713/2 |
| 6,598,131 B1* | 7/2003 | Kedem et al. | 711/147 |
| 6,601,166 B1* | 7/2003 | Ayyar et al. | 713/2 |
| 6,615,365 B1 | 9/2003 | Jenevein et al. | 714/6 |
| 6,684,327 B1* | 1/2004 | Anand et al. | 713/2 |
| 6,711,688 B1* | 3/2004 | Hubacher et al. | 713/201 |
| 6,748,525 B1* | 6/2004 | Hubacher et al. | 713/1 |
| 6,757,837 B1* | 6/2004 | Platt et al. | 714/4 |
| 6,804,774 B1* | 10/2004 | Larvoire et al. | 713/2 |
| 6,810,478 B1* | 10/2004 | Anand et al. | 713/2 |
| 2003/0046529 A1* | 3/2003 | Loison et al. | 713/2 |

OTHER PUBLICATIONS

Henry, Mike, Intel Corporation, *extending PXE to Mobile Platforms,* Jun. 1998, pp. 1-4, http://www.intel.com/update/archive/psn/psn06985,pdf.

Copy of International Search Report as mailed from the PCT on Aug. 13, 2004 for WO Application (PCT/US03/28820; Filed Sep. 10, 2003, 3 pages).

* cited by examiner

SYSTEM FOR MANAGING BOOT-UP OF TARGET COMPUTERS

CROSS-REFERENCES TO RELATED APPLICATIONS

This application is related to the following U.S. Patent Applications which are hereby incorporated by reference as if set forth in full in this document:

Ser. No. 09/663,252 entitled "USER INTERFACE FOR DYNAMIC COMPUTING ENVIRONMENT USING ALLOCABLE RESOURCES" filed on Sep. 15, 2000, still pending; and Ser. No. 10/241,809 entitled "SYSTEM FOR AUTOMATED BOOT FROM DISK IMAGE" Sep. 10, 2002, still pending.

BACKGROUND OF THE INVENTION

This invention relates in general to digital data processing and more specifically, to a system for managing start-up, or boot-up of computer systems. When a computer system is first powered up many functions must take place to put the computer into an operational stage. These functions are commonly referred to as "boot-up," "booting," "bootstrapping," "booting up," etc.

Typically, the booting procedure is well defined for any given machine. However, procedures can vary from computer to computer especially where the computers have different resources and peripherals, are configured differently, have been made by different manufacturers, are intended to execute different software, etc.

In some computer applications, it is desirable to coordinate, interconnect and configure multiple computer systems so that more computing power, or resources, are available. A problem arises when many computers need to be automatically allocated, controlled or otherwise managed. One approach is to use a managing "server" computer to interrogate, configure or otherwise communicate with and control the multiple "target" computers. However, one problem with this approach is that when the target machines are initially powered up, one or more of them may be designed to automatically boot into an operational mode. In this respect, the server does not have control over the target computer during the boot-up phase. This lack of control may prevent the managing server from properly gaining control of, and configuring, the booting target computer.

Thus, it is desirable to provide a system for managing boot-up of a target machine when the target machine is powered up.

BRIEF SUMMARY OF THE INVENTION

One embodiment of the present invention provides a system for managed boot-up of a target machine upon power up of the target machine. The system provides a notification mechanism coupled to the target machine that is configured to send notification of power-up to a managing processor. The managing processor is configured to provide to the target machine discovery software configured to determine one or more characteristics of the target machine, which are then used to provision a software environment for the target machine.

One aspect of this embodiment further provides provisioning software configured to be installed on the target machine, wherein the software is configured to support the characteristics of the target machine and which is configured by the managing processor in response to the data describing the characteristics of the target machine.

Another embodiment of the present invention also provides a method for controlling boot-up of a target machine upon power up of the target machine. A notification from the target machine indicating that the target machine has been powered up is received. Discovery software is provided to the target machine. The discovery software is configured to obtain information about characteristics of the target machine, and that information is used to provision a software environment for the target machine.

One aspect of this embodiment further provides for receiving a DHCP notification from the target machine and transferring boot-up software to the target machine in response to that DHCP notification. In one embodiment of this aspect of the invention, the boot-up software includes instructions executable on the target machine configured to establish a network link to the managing processor and to request a transfer of the discovery software.

Another aspect of this embodiment of the present invention provides for accepting signals from a user input device to modify a determination of one or more resources in the target machine. A further aspect of this embodiment of the present invention provides for determining the type of the target machine and transferring discovery software based on the type of the target machine. Another aspect of this embodiment provides for receiving data provided by the discovery software describing characteristics of the target machine and, in response to that data, configuring a provisioning agent to install one or more software instructions to support the described characteristics and providing that provisioning agent to the target machine.

DETAILED DESCRIPTION OF THE INVENTION

Figure 1:
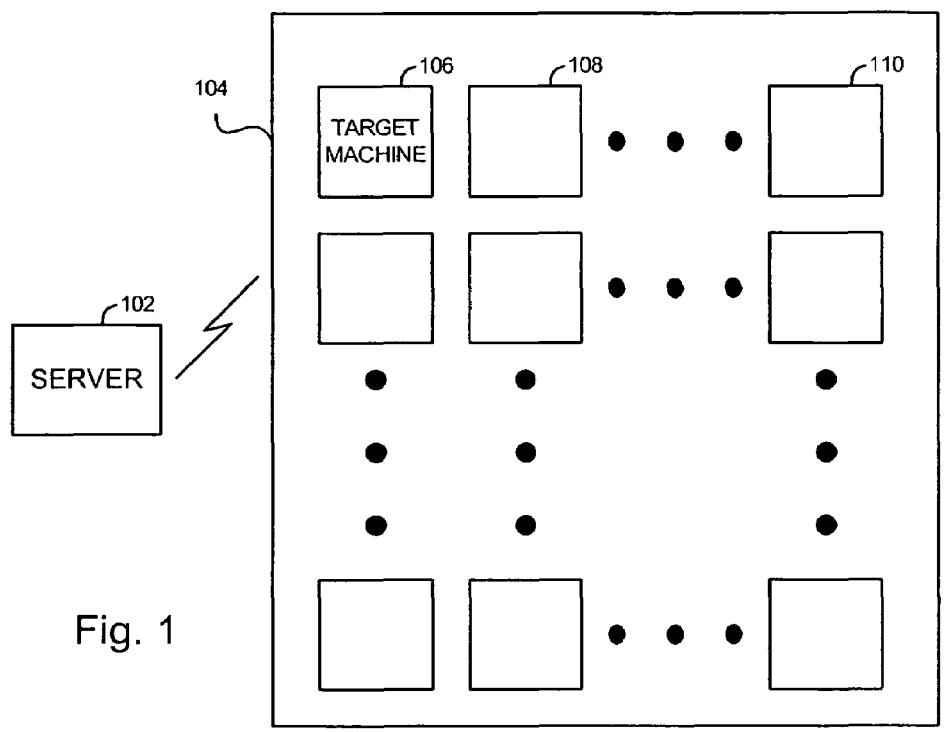
FIG. 1 shows an application of the system of the present invention.

FIG. 1 shows an application of the system of the present invention.

In FIG. 1, server 102 is a computer system for managing target machines in a configurable network. The configurable network is represented by resource 104. Any type of processing equipment or devices can be considered resources including processing units, memory, communication bandwidth, storage, functionality, etc. Such resources can be provided by software, hardware or a combination of both.

Server 102 detects when target machines such as 106, 108 and 110 are initially powered up. A preferred embodiment of the invention requires a human administrator to manually power up one or more target machines. Other embodiments can automate the power-up process. Server 102 then acts to control the boot up of one or more of the target machines, as desired. During boot-up, characteristics and resources that are local to a specific target machine (e.g., disk drive, random-access memory (RAM), processor type, peripherals, communication ability such as network cards, etc.) are determined or "discovered" and reported back to the server. After controlled boot-up and discovery, server 102 can also activate, allocate, or configure, resources, including resources 104, to work with a target machine. Server 102 can manage operations including loading software on the target machines, directing interconnectivity of target machines on a network, etc.

A preferred embodiment of the invention is adapted for use with dynamic computing environments (DCEs) such as the DCE described in co-pending U.S. patent application Ser. No. 09/663,252 entitled "USER INTERFACE FOR DYNAMIC COMPUTING ENVIRONMENT USING ALLOCABLE RESOURCES" filed on Sep. 15, 2000.

Target machines can be any type of computer system or other processing device. For example, personal computer systems, servers, workstations, mainframes, etc., can be target machines. Such machines can be based around different manufacturers' designs such as Intel, Advanced Micro Devices (AMD), SUN Microsystems, etc. Different models, versions and configurations of machines are typically available from each manufacturer. For example, some machines may vary in the processor type, attached peripherals, internal memory capacity, communication ability, etc. Target machines can also be devices that are not based on a general purpose microprocessor design. For example, target devices can be based on parallel processing, distributed processing, asynchronous or other designs. Target machines can be standalone peripherals, network devices, etc. Target machines can use customized circuitry, application-specific integrated circuits (ASICs), field-programmable gate arrays (FPGAs), discrete, dedicated or custom circuitry, etc. In general, any type of device, including digital, analog, mechanical, biotechnology, optical, etc. can be a target machine.

In the preferred embodiment, the target machines are interconnected based on specific configuration. The interconnection mechanism can be by hardwire, fiberoptic, wireless or other type of communication link. A digital network such as, e.g., Ethernet, IEEE 1394, universal serial bus (USB), 802.11 b, etc. can be used. In a preferred embodiment, the linking of communication channels between target machines, the server, external devices and networks (such as the Internet), etc., is controlled and managed by the server.

Note that server 102 can, similarly, be any type of a processing device from any manufacturer. Many types of processing devices can be used to implement server 102. Additionally, different types of software from those specifically discussed herein can be run on server 102 to achieve the same functionality described in the present invention. Multiple computers or devices can be used to achieve the functionality of the managing server, discussed herein. In the preferred embodiment, the managing server executes software manufactured by Jareva Technologies, Inc., and referred to as "OpForce." Other software that performs functionality described herein manufactured by Jareva Technologies, Inc., includes "ActiveOS" and "OpBoot."

A preferred embodiment of the invention executes on Intel x86 chips and is written in a standard Linux INITRD format. OpBoot is treated as a Network Boot Program (NBP) within the Linux environment as defined by the PXE standard. Steps accomplished by this preferred embodiment are listed in Table I, below.

TABLE I

1. Initialize and read parameters form DHCP option-135 (see, e.g., DHCP standard RFC-2131 for description of DHCP options);
2. TFTP the two ActiveOS files into extended memory into the standard locations defined by Linux; and
3. Jump to the start of the Linux kernel (as defined by Linux).

Another embodiment executes on a Solaris platform. The Solaris version of the ActiveOS is a miniaturized version of the Sun Solaris OS. A bootstrap program is TFTPed and the rest of the ActiveOS is NFS mounted using the standard Solaris mechanisms. It should be apparent that any type of software that achieves the functions, operations and other aspects of the invention can be suitable for use in accordance with the invention and is within the scope of the invention, as claimed.

A preferred embodiment of the invention uses popular standardized protocols to allow the managing server to prepare target machines for communication and operation upon boot-up. The Dynamic Host Configuration Protocol (DHCP) is used to automate the assignment of Internet Protocol (IP) addresses in the resource network. A Bootstrap Protocol (BOOTP) along with DHCP options and BOOTP vendor information extensions is also used. This allows target machines without disks and specific bootstrapping software to discover the target machine's own IP address, the address of a server host and the name of a file to be loaded into memory and executed. Descriptions of these protocols can be found on the Internet, or by reference to the following Request For Comments (RFCs): RFC9510, RFC2131 and RFC2132. Other protocols for communicating within the DHCP framework include: Boot Control Transfer Protocol (BCTP), Trivial File Transfer Protocol (TFTP), user datagram protocol (UDP) and others. It should be apparent that the specific use of these protocols is not necessarily to practice the invention. In general, any type of protocol, communication scheme, network architecture, etc. can be acceptable for use with the present invention.

A preferred embodiment of the invention uses a mechanism whereby, upon powerup, a target machine communicates to the server that the target machine is ready to boot. In the preferred embodiment, each target machine is provided with a Network Interface Card (NIC) such as one that follows the Preboot Execution Environment (PXE) standard. The PXE NIC broadcasts a "ready-to boot" message to the server upon powerup. The server then transfers an executable object to the target machine. In a contemplated embodiment, the executable object is about 8 MB and is called ActiveOS. ActiveOS is loaded and executed via instructions in OpBoot onto the target machine. ActiveOS then inspects the target machine to discover the hardware configuration, basic input/output system (BIOS) version and other aspects of the target machine. In the preferred embodiment, ActiveOS runs completely in memory so that no hard disk is needed since some target machines may not have hard disks. ActiveOS is based on LINUX and launches a LINUX kernel to put up a TCP/IP stack.

Table II shows some of the information discovered and sent back to the server by ActiveOS.

TABLE II

Memory
Hard disks
Central Processing Unit (CPU)
Motherboard chip set
System management (BIOS) information Serial number
Model name
BIOS date/version
Computer manufacturer
BIOS vendor
Computer CPU family
Blade Chassis Location (if a blade)
Blade chassis serial number (if a blade)
Blade chassis IP address (if a blade)
Blade chassis model (if a blade)

TABLE II-continued

Rack serial number
Network cards

Table III shows an example of a format used to report information back to the server in a preferred embodiment. Note that other embodiments can use any suitable format. The protocol used in Table III is BCTP. The protocol is BCTP.

TABLE III

--- StatusComplete 1
memsize=128;arch=i686;chipset=8086.7124;cpus=1;cpumhz=598;
net={count=2;0={name=eth0;type=Ethernet;hwaddr=00:D0:B7:7E:94:
BA};1={name=eth1;type=Ethernet;hwaddr=00:90:27:F9:5B:B5}};
hd={count=1;0={name=/dev/hda;size=13}};smbios={BSmanufacturer=
{Intel\sCorp.};BSversion={CA81020A.86A.0005.P02.9911300426};
BSreleaseDate={11/30/1999};MBcpuCount=1;MBavgCpuMhz=600;
MBcpuFamily=17;MBmem=128}

In the preferred embodiment, the information in Table I, and additional information, as desired, is acquired from the target machine when ActiveOS receives a request from the server to generate hardware information. The results of discovering hardware information are sent back to server 102 in the form of scoped attribute value pairs in BCTP protocol. Again, other formats can be employed.

After discovery, the server provides a provisioning agent to the target machine. The provisioning agent is used to install desired software on the target machine. Since different hardware configurations require different types, or versions, of software, the provisioning agent is not loaded until after the hardware configuration of the target machine has been discovered. In a preferred embodiment, the provisioning agent is part of the ActiveOS.

A management system on the server receives a request either automatically, or from a user, that provides a definition of how to configure the target machines and other resources. The server communicates to the provisioning agent which software to install. The provisioning agent can obtain the software to be installed from the server or from a different source.

By default, the provisioning agent obtains the software from a storage server, such as an NFS server, a CIFS server, the OpForce server, etc. In general, the software can be obtained from any server connected to the network using a variety of protocols including custom software. OpForce supports a form of software called "ActiveOS software". The user can write a custom program that runs on the ActiveOS. This program is free to implement a protocol and gather information from any server reachable on the network. In fact, the user can use this to extend the hardware detection that we already do. The user first writes a standard Linux based application. This application is the uploaded into the OpForce system and placed on a storage server. When requested by the user, OpForce tells the ActiveOS to execute the software stored on the storage server. The BCTP messages looks similar to those shown in Table IV.

TABLE IV

--- SetAppDir nfs nfsserver:/directory
--- Modify myExecutable 1 argument1

Because these extensions are accessed from a separate server, the size is not limited to the amount of disk space or the amount of memory on the server. In addition, the extension can use the standard NFS or CIFS protocols, which are much faster and more convenient to use than other protocols, like TFTP or plain TCP/IP.

When receiving this message, the ActiveOS accesses the NFS server, obtains the executable, and executes it.

Table V, below, shows basic steps in a procedure for controlled booting of a target machine where the target machine uses an Intel x86 architecture. Table V also shows, in curly brackets, the alternative protocol to be used when the machine is a SOLARIS type of machine as manufactured by SUN Microsystems, Inc., rather than an Intel machine. In a similar manner, other types of machines can be accomodated.

TABLE V

1. Use DHCP {Solaris = RARP} broadcast to find MAC
2. OpForce (or other server software) allocates IP and send DHCP {Solaris = RARP} response
3. Target downloads OpBoot through TFTP {Solaris = not used}
4. OpBoot downloads ActiveOS through TFTP {Solaris = NFS}

Different versions of ActiveOS are downloaded depending on the detected platform (e.g., SOLARIS OR INTEL). A preferred embodiment automatically determines the correct ActiveOS to use without any user input. DHCP option 60 (see the PXE standard) includes a string containing the architecture that is used to automatically select the correct ActiveOS. The target machine is then booted into the ActiveOS as previously described. ActiveOS is then used to discover the hardware in the machine. This is all done automatically without any user input and without any OS on the machine's hard disk. Other embodiments can use different degrees of manual and automatic operations.

Figure 2:
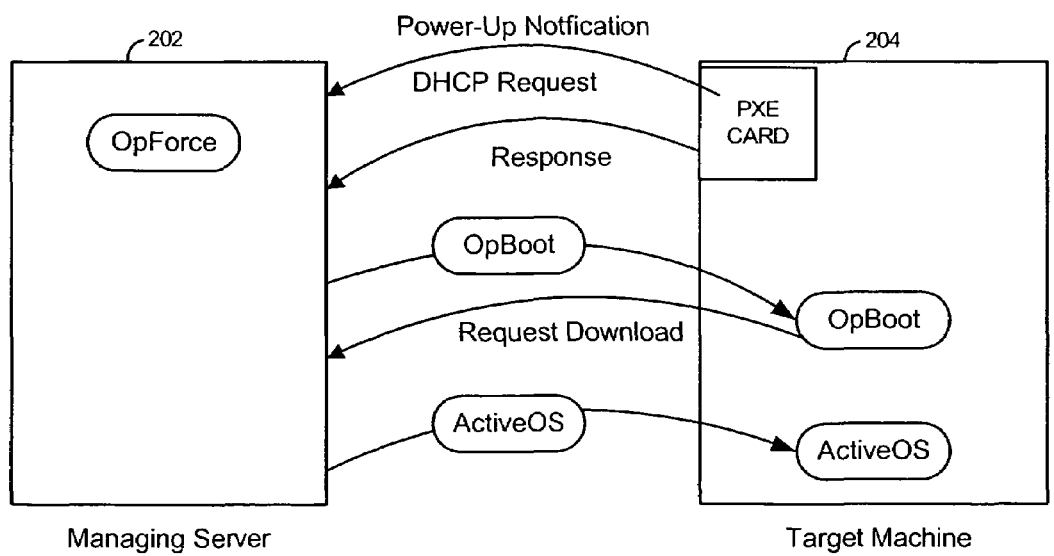
FIG. 2 illustrates steps in a managed boot-up procedure.

FIG. 2 illustrates the steps of Table V. In FIG. 2, managing server 202 controls the boot-up of target machine 204. For ease of illustration, only a single target machine, and single type (Intel architecture) of target machine, is discussed.

Upon power-up, target machine 204 sends a notification to managing server 202. In the preferred embodiment, the notification is made using a PXE card installed in the target machine. In other embodiments, different notification mechanisms can be used. PXE uses the DHCP protocol to generate a request, or notification. OpForce, executing in the managing server, receives the request, allocates an IP address and sends a response. Next, the target machine requests a download of software from the managing server. This results in the managing server transferring OpBoot. The target machine then executes OpBoot, which requests a download of ActiveOS. ActiveOS is provided by the managing server and is installed and run on the target machine.

In the preferred embodiment, ActiveOS is sent as a compressed file of about 8 MB. It is also possible to send the file uncompressed at a size of about 30 MB. Once loaded, ActiveOS is executed to allow the server to direct discovery and provisioning of the target machine. Details of these operations are described in detail in co-pending patent applications listed, above.

Although the system of the present invention has been described with respect to specific embodiments thereof, these embodiments are illustrative, and not restrictive, of the invention, the scope of which is determined solely by the appended claims.

What is claimed is:

1. A system for controlling boot-up of a target machine upon power-up, the system comprising
   a managing processor;
   a notification mechanism coupled to the target machine configured to send a notification to the managing processor that the target machine has been powered-up;
   discovery software configured to determine one or more characteristics of the target machine, wherein
      the one or more characteristics comprise memory type, hard disk type, hard disk capacity, number of hard disks, processor type, motherboard chip set, network card type, System Management Software ("SMS") serial number, SMS model name, SMS data, and SMS version, and
      the determined one or more characteristics are used to provision a software environment for the target machine; and
   server software executed by the managing processor configured to transfer the discovery software to the target machine in response to the notification.

2. The system of claim 1, further comprising
   a PXE card coupled to the target machine for sending a DHCP notification.

3. The system of claim 1, wherein no operating system is present on the target machine.

4. The system of claim 1 further comprising:
   a dynamic computing environment coupled to the managing processor, wherein
      the dynamic computing environment comprises resources, wherein
         the resources include one or more of network resources, data storage resources, and computing resources, and
      one or more of the resources is coupled to the target machine in response to an instruction from the managing processor.

5. The system of claim 1 further comprising:
   provisioning software configured to install on the target machine one or more software instructions configured to support the characteristics of the target machine, wherein
      the managing processor configures the provisioning software in response to data describing the characteristics of the target machine, wherein
         the data is provided by the discovery software; and
      the server software is further configured to transfer the provisioning software to the target machine.

6. A method for controlling boot-up of a target machine upon power-up, the method comprising:
   receiving a notification from the target machine indicating that the target machine has been powered-up; and
   transferring discovery software to the target machine, wherein
      the discovery software is configured to obtain information on one or more of the following characteristics of the target machine
         memory type,
         hard disk type,
         hard disk capacity,
         number of hard disks,
         processor type,
         motherboard chip set,
         network card type,
         System Management Software ("SMS") serial number,
         SMS model name,
         SMS data, and
         SMS version, and
      the obtained information is used to provision a software environment for the target machine.

7. The method of claim 6 further comprising:
   receiving a DHCP notification from the target machine.

8. The method of claim 7 further comprising:
   transferring boot-up software to the target machine in response to the DHCP notification.

9. The method of claim 6, further comprising:
   accepting signals from a user input device to modify the determination of one or more resources in the target machine.

10. The method of claim 8, wherein the boot-up software is transferred using the BOOTP protocol.

11. The method of claim 6, wherein the discovery software is compressed.

12. The method of claim 6, further comprising
    determining the type of target machine; and
    transferring different discovery software based on the type of target machine.

13. The method of claim 6 further comprising:
    receiving data describing the characteristics of the target machine,
       wherein
          the data is provided by the discovery software; and
    in response to said description of the characteristics,
       configuring a provisioning agent to install one or more software instructions configured to support the characteristics described, and
       providing the provisioning agent to the target machine.

14. The method of claim 8, wherein
    the boot-up software comprises instructions executable on the target machine configured to
       establish a network link to a managing processor, and
       request a transfer of the discovery software, wherein
          the discovery software is configured to execute on the type of the target machine.

* * * * *